United States Patent [19]

Hauser

[11] 4,437,367

[45] Mar. 20, 1984

[54] PROCESS AND APPARATUS FOR CONTROLLING THE CUTTING FEED OF BAND SAW MACHINES

[76] Inventor: Karl Hauser, Rebstrasse 10, 8302 Augwil, Switzerland

[21] Appl. No.: 247,985

[22] Filed: Mar. 26, 1981

[30] Foreign Application Priority Data

Mar. 27, 1980 [CH] Switzerland .................. 2402/80

[51] Int. Cl.³ ............................................ B23D 53/00
[52] U.S. Cl. ........................................ 83/13; 83/62.1;
83/71; 83/72; 83/74
[58] Field of Search ................ 83/71, 72, 74, 75, 801, 83/62.1, 13

[56] References Cited

U.S. PATENT DOCUMENTS

| | | | |
|---|---|---|---|
| Re. 25,901 | 11/1965 | Whitmore | 83/74 |
| 3,680,417 | 8/1972 | Wells | 83/74 |
| 4,016,787 | 4/1977 | Sugimoto | 83/72 |
| 4,306,478 | 12/1981 | Stolzer | 83/488 |

*Primary Examiner*—James M. Meister
*Attorney, Agent, or Firm*—Craig & Burns

[57] ABSTRACT

A method and apparatus for controlling the cutting feed of band saw machines for obtaining an optimum feed rate with the same safety against straying of the saw cut, according to which the saw band is maintained continuously within the area of its teeth under a residual tensile stress ($\sigma_{ZRes}$) adjusted at least approximately to a constant value. For this purpose, a desired value is selected for the residual tensile stress, determined experimentally under practical conditions, which is correspondingly converted in case of load conditions of the saw blade deviating from the experiment, and this desired value is compared with the actual value. The actual value ($\sigma_{ZRes}$) is derived as a difference from the tensile stress ($Z$) in the critical saw band point and the bending stress $\sigma_B$ caused by the feed, to be $\sigma_{ZRes} = \sigma Z - \sigma B > 0$. The actual value is adjusted to the desired value by varying the feed rate; the sum total of all feed forces or the sagging angle of the saw band is selected as a measure for the actual value. As a result thereof the danger of straying is precluded and yet an economically optimal feed rate is attained in band saws.

21 Claims, 9 Drawing Figures

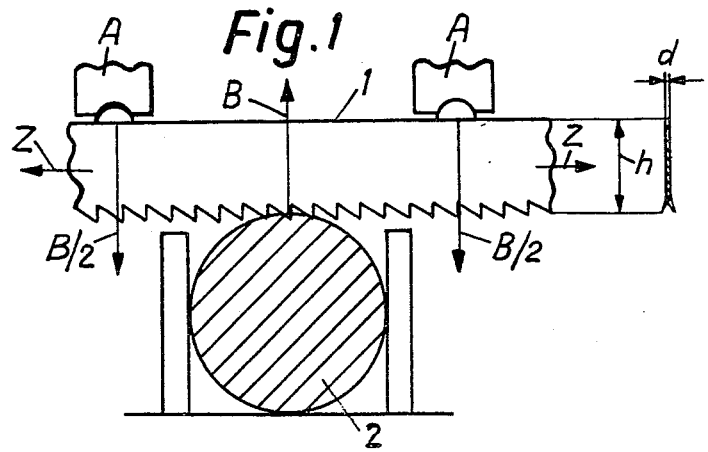
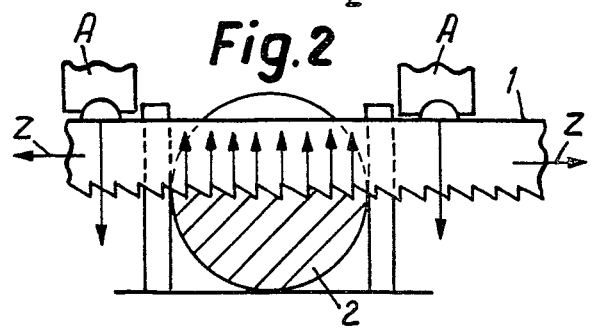
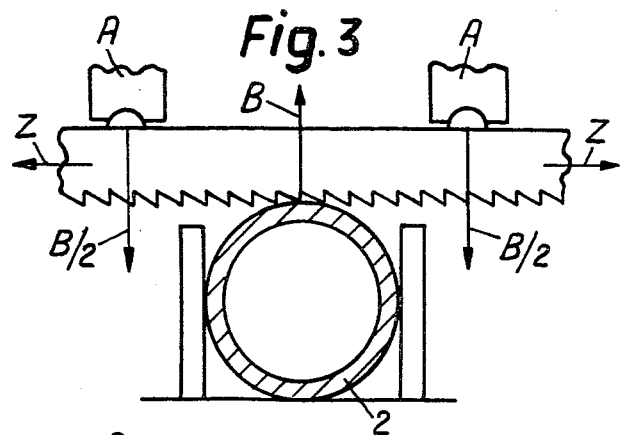
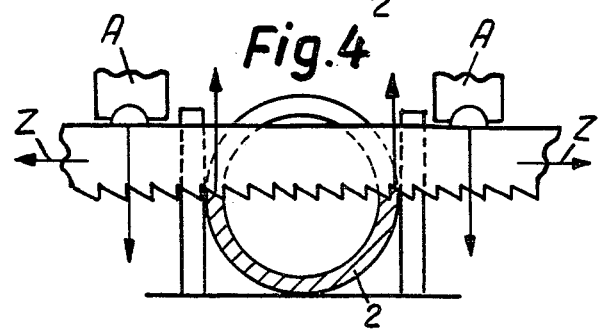

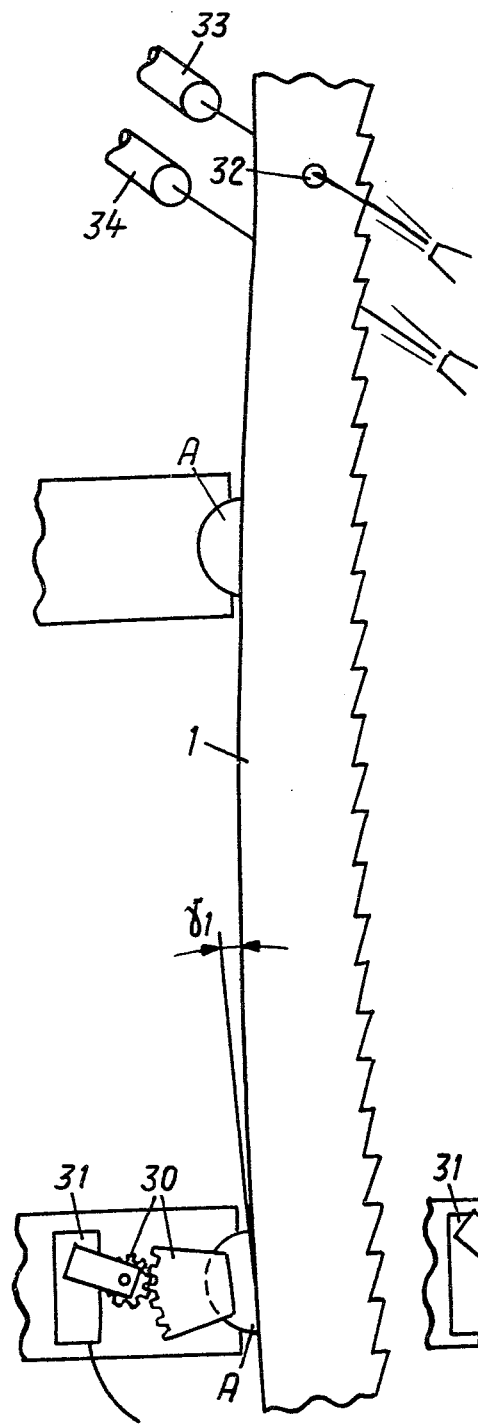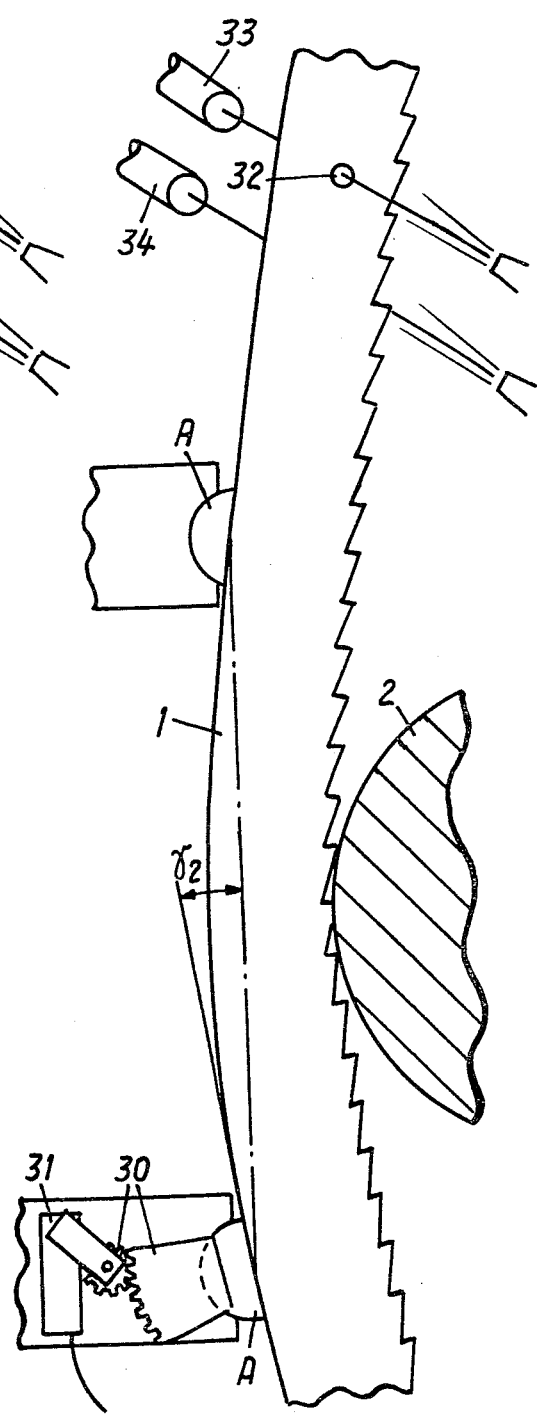

PROCESS AND APPARATUS FOR CONTROLLING THE CUTTING FEED OF BAND SAW MACHINES

BACKGROUND AND SUMMARY OF THE INVENTION

The invention relates to a method and apparatus for controlling the cutting feed of band saw machines for obtaining an optimum feed rate or velocity with the same safety against straying (pulling out of line) of the saw cut.

In band saw machines, for example metal band saws, it is necessary to adapt the cutting feed velocity or the feed force to the stress or load on the saw band produced by the cutting forces. Various methods are known for this purpose. For example, in band saw machines a constant force is exerted on the saw band in the direction of the cutting feed during the cutting operation. Also, a so-called hydraulic cutting force control is known which likewise serves for maintaining a preselectable feed force at a constant value.

These methods and devices are completely satisfactory only in those exceptional cases in which the cutting forces and the distribution thereof remain unchanged during cutting over the entire cutting surface.

Another technical solution of the feed system in band saws resides in a forcible advance of the saw carriage with a constant feed velocity, for example under the control of a hydraulic quantity regulator (governor).

The methods do not take into consideration changes in the cutting force distribution and/or the wear conditions of the saw band. With progressive wearing of the tool, there exists with the latter method the danger of the band straying out of the cut.

All of the aforementioned known methods for the feed control of band saw machines entail the following grave disadvantages:

Even if numerical data material is available for the preselection of the feed force or the feed velocity, great risks are involved in the use thereof by, in most cases, unskilled assistant personnel. If large safety margins are utilized in operation, the machines and tools are then utilized to only a small part of their inherent capacity.

The preselection of a constant feed force or feed velocity represents a considerable compromise in all those instances, in which the cutting force distribution varies over the cross section of the cut material, for example during the sawing of round material. Large losses in performance result, since the adjusted feed value must be chosen according to the most unfavorable conditions.

The low stability of the saw band renders the cutting performance greatly dependent on the wear condition of the tool. In case of constant cutting feed, the adjusted feed value must be selected under consideration of the worn tool.

The invention is based on the following task:

A method and apparatus are to be provided which permit, while excluding the danger of straying, an optimum feed velocity with band saws.

Furthermore, the following partial tasks are also to be solved by the present invention:

The economically optimal cutting feed is to adust itself automatically, i.e. without preselection and independently of the strength or rigidity of the material to be cut.

The shape of the cross section of the material to be sawed is to be constantly taken into account, after preselection at the operating panel, by an appropriate automatic adaptation of the feed rate. Consequently, optimum cutting conditions and thus a maximum cutting performance are to result over the entire cross section.

The blunting or wearing of the saw band is to be considered as well to the full extent during the automatic optimization of the feed velocity. Once the saw band wear reaches a preselectable magnitude, the machine is to be automatically stopped. Additionally, prior to stopping the machine, the wear condition of the tool is to be constantly indicated in a digital fashion.

The method according to this invention is characterized in that the saw band is continuously maintained within the critical area of its teeth under a tensile stress adjusted at least approximately to a constant value.

The apparatus for carrying out the method is characterized by means for controlling the tensile stress of the saw band.

These and further objects, features and advantages of the present invention will become more apparent from the following description when taken in connection with the accompanying drawings which show, for purposes of illustration only, several embodiments in accordance with the present invention.

BRIEF DESCRIPTION OF THE DRAWINGS

FIGS. 1–4 are purely schematic fragmentary side views of band saw machines with material to be sawed in different positions, with the solid and tubular workpiece material, respectively shown in cross section view;

DESCRIPTION OF THE PREFERRED EMBODIMENTS

The saw band 1 (see FIG. 1) represents a beam on two supports A, which is very narrow (thickness d) in relation to its height h. If this beam is subjected to bending stress, as for example by the individual load B, then the tooth-studded side of the saw band tends to buckle. To prevent this from happening, a constant tensile force Z is applied uniformly distributed over the saw band cross section (see FIGS. 1–5). This tensile force Z results in a tensile stress $\sigma_Z$, uniformly distributed over the cross section, on which are superimposed the bending stresses $\sigma_B$ stemming from the cutting forces. FIGS. 1–4 illustrate how the distribution of the cutting forces over the cutting line varies in dependence on the cross-sectional shape of the cutting material 2. If this cross-sectional shape is programmed into the computer, the latter can thus calculate by means of an appropriate computer program the bending stress in the saw band cross section at any level of the cross section to be sawed. This bending stress is superimposed by the computer over the uniformly distributed tensile stress.

Figure 5:
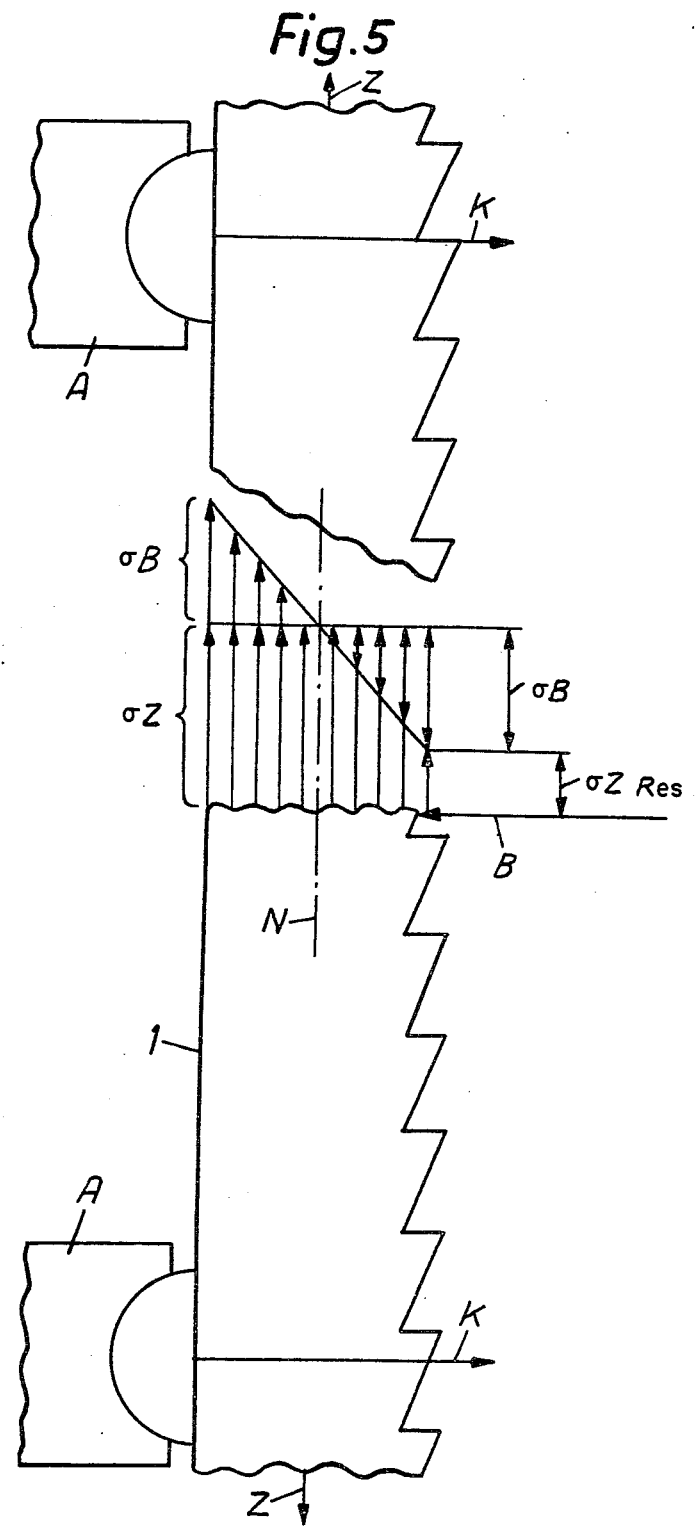
FIG. 5 is a fragmentary view of a band saw indicating the bending and tensile stresses as well as the corresponding stresses in the critical saw blade cross section, FIG. 6. is a somewhat schematic view of a band saw machine feed control.

On the tooth-studded side of the saw band, the tensile stresses $\sigma_Z$ and bending stresses $\sigma_B$ compensate each other in part (FIG. 5). Due to the unavoidable, small asymmetries of the cutting forces and of the small transverse rigidity of the saw band, a residual tensile stress $\sigma_{ZRest}$ must be preserved on the toothed saw band side in order that the saw band does not "stray".

The task of the saw feed control according to the invention thus resides, in the final analysis, in controlling the bending stress $\sigma_B$ in such a manner that a sufficiently high residual tensile stress $\sigma_{ZRes}$ (see FIG. 5) is constantly present and kept at a constant value, independent of the distribution of the cutting forces and the wear condition of the saw band. Only by such a method can the goal of the present invention of a safety of the saw band against straying, which remains constant, be attained independently of the prevailing load condition.

The numerical value of this residual tensile stress in the critical cross section of the saw band can be determined only empirically. In case of saw band load conditions deviating from the experimentally produced conditions, the computer will make the necessary calculations and will feed a corresponding desired value to the controller. The actual value, for example the feed force, is measured constantly and compared with the desired value provided by the computer. In case of a deviation, an adaptation of the feed force is effected in such a way that the deviation becomes zero. Then the feed force is kept constant until another deviation occurs.

With an increasing wear of the saw band, the desired value predetermined by the computer is reached already at a lower feed rate, corresponding to the amount of wear.

The desired value can be made variable, by programming, for example. In case of new teeth, or newly sharpened teeth, the desired value for the feed force is set to be lower. This desired value starts with a lower magnitude according to the program (for example the integrated band operating time) and is increased again after a breaking-in period. This reduction of the feed velocity with increasing saw band wear, is received, stored and made visible at the panel by the control unit. The measurement of the reduction of the feed rate can take place, for example, in that during each cutting cycle the time period for the traversal of a certain distance by the saw carriage, is measured and compared from one cycle to the next.

Instead of predetermining the desired value of the cutting feed force by the control unit, it is also possible to selectively predetermine the desired value for the sagging or bending angle under each support A. This angle, just as the desired value for the feed force, is based on the consideration that an experimentally determined residual tensile stress $\sigma_{ZRes}$ must be retained during all saw band load conditions or bending that the safety margin against straying of the saw band remains preserved. The cap-shaped (hemispherical) sliding blocks A (see FIGS. 8, 9) permit sagging or bending of the saw band in the vertical plane. The rotation of these sliding blocks about a horizontal axis can be amplified, for example, by mechanical elements 30 and, for example, the magnetic field of a magnetoresistor field plate potentiometer 31 can be shifted in such a way that a signal can be picked up which is proportional to the sagging or bending angle $\sigma$ of the saw band (for example voltage). The deviations due to linearity variations resulting from the manufacture of the saw band must be filtered out of the angle measurement result. For example, the average value of the sagging or bending angle $\sigma$ from each band revolution can be utilized as a signal for the actual angle value. Positive and negative (Plus and minus) values caused by manufacturing inaccuracies are thus compensated for. To mark each saw band revolution, a transverse bore 32 through the saw blade body can be employed, which is scanned, for example, by a photocell 33 (FIGS. 8 and 9).

Another solution possibility, more expensive from a technical viewpoint and thus less advantageous, resides in detecting at each tooth gap at the saw band circumference the sagging or bending angle of the saw band under no-load conditions (FIG. 8) and incorporating this value into the memory of the control unit. These angles $\sigma_1$ correspond to the manufacturing inaccuracies. The tooth gaps, in turn, can again be signaled by a photocell 34. Since also the beginning of each saw band revolution is marked by photocell 33, the sagging or bending angle $\sigma_2$ under load conditions of the saw band can likewise be detected at each tooth gap (FIG. 9), and can be compared with the angle in the no-load condition. The difference ($\sigma_2 - \sigma_1$) is the amount of effective sagging or bending due to the cutting forces and is to be compared with the desired value. In case of a deviation, the feed rate is to be raised or reduced correspondingly.

The following is a typical numerical example for a sagging or bending angle $\alpha$ of the saw band at support A:

Assumed:
Point load (cutting force effective concentrated in the middle between the supports A): 120 kp; spacing of the supports A: 200 mm
Saw band dimension (cross section of band element): 60×1.6 mm Sagging angle: $tg\ \alpha = \dfrac{P \cdot l^2 \cdot 3600}{16 \cdot J \cdot E}$ (in angular seconds)

Moment of inertia of saw band:

$$J = \dfrac{b \cdot h^3}{12} = \dfrac{0.16 \cdot 6^3}{12}$$

$$J = 2.88\ cm^4$$

$$tg\ \alpha = \dfrac{120 \cdot 20^2 \cdot 3600}{16 \cdot 2.88 \cdot 2.2 \cdot 10^6} = 1.7$$

$\alpha = 1.7$ angular seconds

Figure 6:
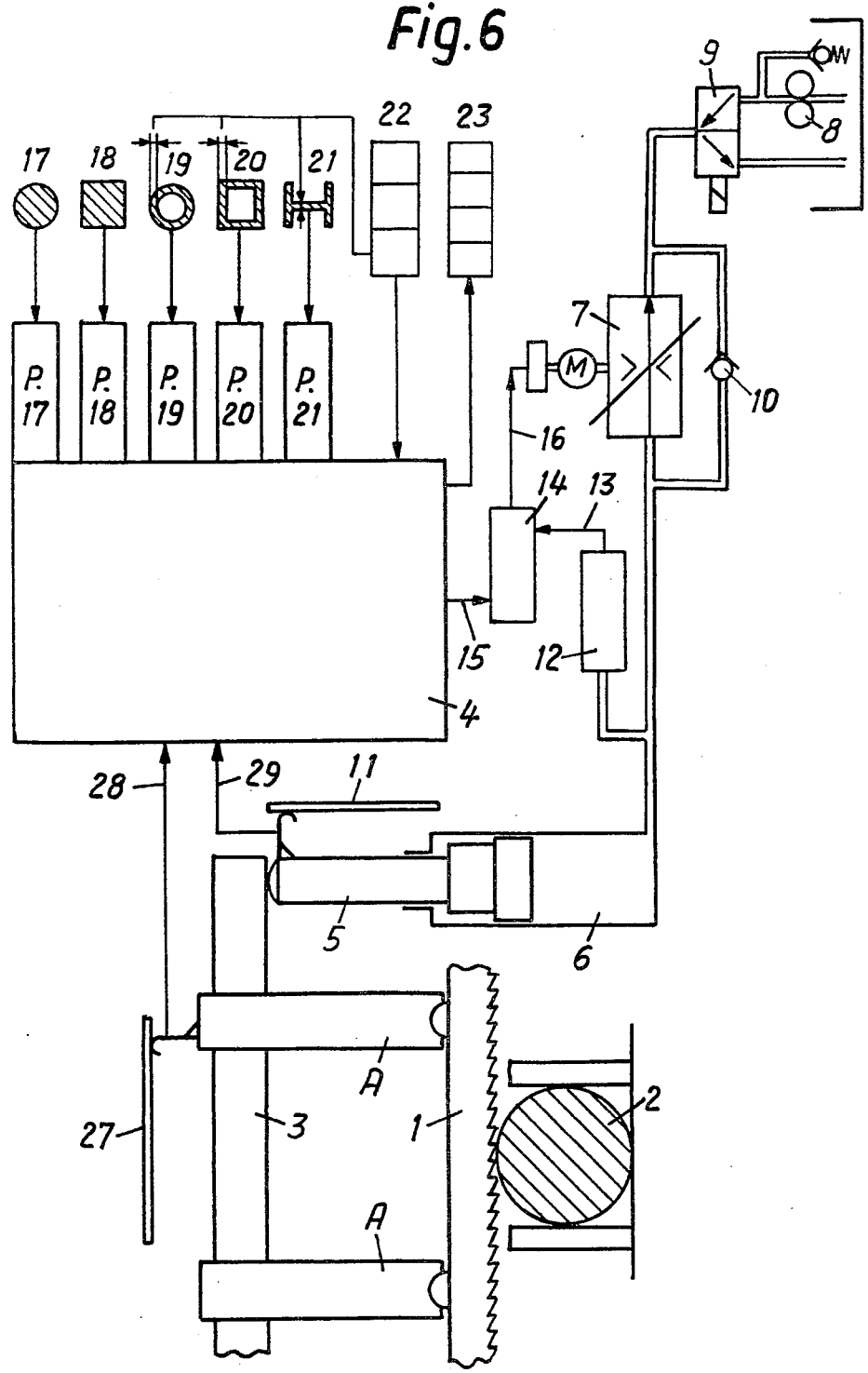

FIG. 6 shows an example of the apparatus of this invention for the automatic control of the cutting feed utilizing a hydraulic feed system. The saw band 1 is supported by the saw carriage 3 by means of the two supports A as close as possible to the material to be cut 2. The spacing of the two supports A is measured by a suitable length measuring system, for example, by a linear potentiometer 27 and is fed into the computer 4. The saw carriage 3 moves in vertically disposed guide means, not shown in FIG. 6, and rests on the piston 5 which, in turn, is guided in a likewise vertically arranged cylinder 6. Due to the weight of the saw carriage 3, the oil underneath the piston 5 is displaced and is forced through the control slot of the remotely controllable flow regulating valve 7. The magnitude of saw carriage feed can thus be varied by adjusting the control slot in the flow control valve 7. After termination of the saw cut; i.e. when the saw carriage 3 has reached the lowest position, the oil stream produced by a pump 8 is conducted through the directional control valve 9 via the check valve 10 to the bottom side of the piston 5, and thus the saw carriage 3 is pushed back at high speed into the uppermost position. The position of the saw carriage 3 and thus the traversed cutting feed distance is fed as input into the computer 4 by a length measuring system, for example a linear potentiometer 11.

The oil pressure underneath the piston 5 is measured by the pressure pickup 12, is converted into a corresponding electrical, analog signal 13, and is fed to the control unit 14. This unit receives an electrical signal 15 from the computer 4, which represents the desired value. The control unit 14 compares the signals 13 and 15 and, in case of inequality, transmits a governing variable or guide magnitude 16 for the remote adjustment of the flow control valve 7.

The computer 4 calculates the desired value 15 on the basis of the preselected program. The symbols 17, 18, 19, 20, 21 represent selector switches or push buttons in the operating panel of the machine for designating the cross-sectional profile of the workpiece to be cut.

Data regarding the wall thickness in case of hollow profiles are fed as input into the computer 4 by means of the selector switch or decade switch 22 in the machine operating panel. With this information, the computer decides whether the feed control according to the invention is to become effective, or whether a constant, preselectable feed velocity it to be engaged if too small a number of teeth at the saw band would have to absorb the feed force.

It is customary to counteract this difficulty by the use of fine-toothed saw bands. The following study demonstrates that this is connected with economical disadvantages:

The total cutting force (cutting force per tooth times number of saw teeth in engagement) of a saw band is limited on account of the relatively slight stability (rigidity) of the band. In case of finer saw band teeth, the total cutting force therefore remains the same, and the cutting force per tooth, $P'$, must become lower corresponding to the toothed arrangement.

Cutting force per tooth $P' = f \cdot ks = b \cdot d \cdot ks$
wherein
$P'$ = cutting force per saw tooth
$f$ = cross-sectional area of cut = cutting width b times cutting thickness d
(the larger the cutting thickness attainable, the higher the cutting performance of the machine)
$ks$ = constant, dependent on the strength or rigidity (hardness) respectively the cutting property of the material to be cut As can be seen from the values for ks available from the literature, ks is dependent, besides depending on the cutting property, also on the cutting thicknesses d. In particular with very small cutting thicknesses which result from fine-toothed saw bands, the ks value (below about d=0.005 mm) increases strongly progressively. It can be seen from the formula $P' = b \cdot d \cdot ks$ that this greatly increasing ks value can only be at the cost of the cutting thickness d and thus at the expense of the cutting performance, since $P'$ cannot be increased due to the limited stability of the saw band.

The numerical indication 23, likewise accommodated in the panel, shows the wear condition of the teeth of the saw band 1.

The mode of operation of the apparatus according to this invention shown in FIG. 6 is as follows:

The saw carriage 3 is guided in the vertical plane and rests on the hydraulic piston 5 which, in turn, is guided in the vertically arranged cylinder 6. The weight of the saw carriage 3 rests on the oil underneath the piston 5. This oil is forced out through the control slot of the remotely controllable flow regulating valve 7. Accordingly, by adjusting the control slot or gap in the flow regulating valve 7, the cutting feed rate can be regulated.

During the start of the cutting operation, the reaction of the cutting forces acts on the saw band and thus on the saw carriage 3. The piston 5 is thus relieved by the cutting forces and thereby the oil pressure underneath the piston 5 is reduced. The change in resistance in a crystal under the load of the oil pressure serves for generating an electrical signal 13 in the pressure pickup 12, which indicates proportionally the change in oil pressure and which is fed to the control unit 14 and the actual value 13 of the cuttng force. After termination of the saw cut, i.e. when the saw carriage 3 has reached its lowest position, the oil stream produced by the pump 8 is conducted through the directional control valve 9 by way of the check valve 10 to the bottom side of the piston 5 and consequently the saw carriage 3 is pushed back with high speed into the uppermost position.

The cutting feed during the sawing operation is controlled by the computer 4 by the output of an electrical desired-value signal 15 for the total cutting feed force. This signal, correspnding to the feed force, is compared in the control unit 14 with the actual-value signal 13 for the feed force, supplied by the pressure pickup 12. In case of inequality, a signal is transmitted by the control unit 14 for adjusting the remote-controllable flow regulating valve 7. For example, if the actual value 13 supplied by the pressure pickup 12 is smaller than the desired value 15 for the feed force supplied by the computer 4, then the control unit 14 transmits a guide magnitude in the form of a signal 16 to the flow regulating valve 7 in the sense that the control slot or gap of this valve 7 is opened and thus the cutting feed is increased. The signal 13 is changed by the increased cutting feed by way of the pressure pickup 12 in the sense of a larger feed force and is thus matched to the desired value 15. If the actual value 13 corresponds to the desired value 15, then no signal is transmitted from the control unit 14 to the flow regulating valve 7, whence the control slot or gap of this valve 7 and therewith the feed remain constant.

The computer 4 receives the following data from the outside:

Spacing of the saw band supports A and therewith largest cutting length corresponding to the respective cutting material (for example by a linear potentiometer 27).

A measuring instrument, for example the linear potentiometer 11, continuously transmits to a computer 4 data on the position of the saw band 1 along the feed path.

During resetting or changing over of the machine, the shape of the material to be cut is fed as an input either manually at the machine panel or by way of data storage media, for example, punched cards, when changing from one cross-sectional configuration of the material to be cut to another one. These cross-sectional shapes at the selector switches 17, 18, 19, 20, 21 can be expanded beyond five, if required.

In case of hollow profiles, the wall thickness must also be introduced in addition to the cross-sectional configuration. Depending on the pitch of the saw band teeth and the cutting length, it may be necessary to switch over the cutting feed control from a predetermined and controlled feed force to a constant feed velocity. This is the case, for example, if the predetermined feed force would have to be absorbed by less than three saw band teeth.

Each of the preselected cross-sectional configurations of the cutting material triggers a corresponding computer program in the computer 4, according to which, in conjunction with the other input data from the selector switch 22 and the signals 28 and 29, the optimum desired value for the cutting feed force is calculated in each saw blade position and supplied at the output as the desired-value signal 15. This desired value is based on a conversion from an experimentally determined residual tensile stress value $\sigma_{ZRes}$ on the toothed side of the saw band (see FIG. 5).

The increasing saw band wear becomes noticeable in the sense that the actual value for the feed force is reached at an increasingly lower cutting feed rate. The time required for traversing a certain distance on the measuring device, the linear potentiometer 11, can be measured, for example, with each sawing cycle, stored, and compared with the preceding values.

Consequently, the computer 4 can constantly record the reduction in feed rate with respect to the new, or newly sharpened, saw band 1 and can calculate the precentage reduction of the feed. This percentage reduction can serve as yardstick for the wear of the saw band. This value is constantly indicated visually with the numerical indicator 23 and, upon reaching a preselectable maximum value (e.g. 100%), a signal for stopping the machine is produced, indicating the cause for such stoppage.

This adaptive cutting feed control according to the invention constantly regulates the feed force exerted on the saw band in the sense that the safety margin against straying of the saw cut remains constant under all load conditions of the saw band. These load conditions, i.e. the distribution of the cutting forces over the cutting length, depend on the cross-sectional shape of the material to be cut. This cross-sectional shape is introduced, during resetting of the machine, by way of a keyboard in the operating panel into the feed control (for example, solid material, round, square, rectangular; or hollow material, round, square, rectangular; or other profiles, such as T-shape, U-shape, L-shape).

To avoid overstressing of individual teeth of the saw band, the wall thickness is additionally fed as an input in case of hollow material. The control automatically switches over to a preselected, constant rate of the cutting feed, if the feed force must be absorbed by too small a number of saw blade teeth. For example, during a sudden transition to short cutting length, the switching-over to a constant cutting feed velocity can be triggered by the change in current input of the main drive mechanism.

Figure 7:
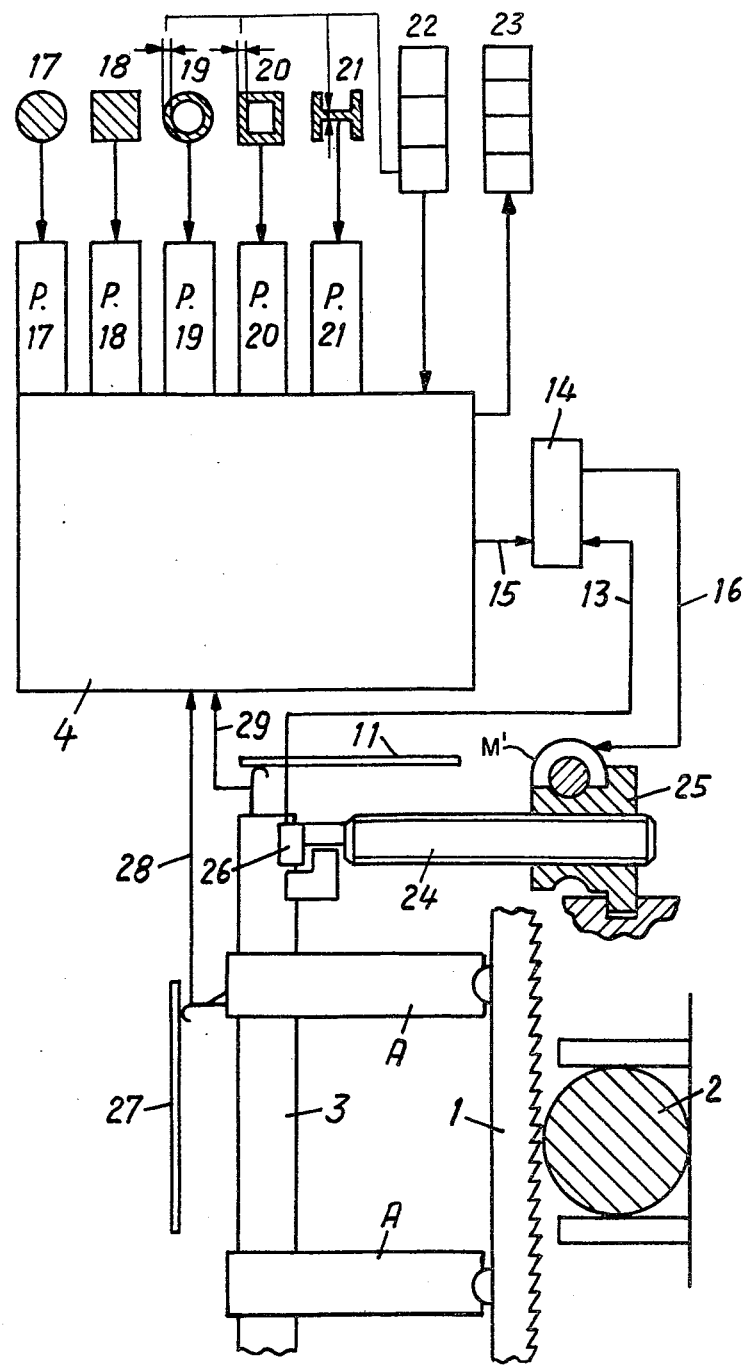
FIG. 7 is a modification of the arrangement according to FIG. 6, and FIGS. 8 and 9 are somewhat schematic views illustrating a sensor modification according to the present invention for measuring the size of the feed force.

FIG. 7 illustrates another embodiment of the apparatus of this invention for the automatic control of the cutting feed by means of an electromechanical feed system. The electromechanical feed system according to FIG. 7 is more advantageous from a technical viewpoint than the hydraulic system, because the pickup of the measuring value at the sensor is ot affected by sliding friction between the piston 5 and the cylinder 6.

A threaded spindle 24 and a nut 25 are provided in place of the hydraulic piston and cylinder, which are driven, for example, by a stepping motor, a controlled direct-current motor, a synchronous motor, or an asynchronous motor, or a hydraulic motor, M'.

A piezoelectric element 26 can be utilized, for example, in place of the hydraulic/electrical pressure pickup 12.

The remaining elements correspond to those described in the description of the embodiment of FIG. 6 and accordingly bear like reference numerals. The hydraulic elements are dispensed with.

The mode of operation of FIG. 7 embodiment differs from that of the FIG. 6 embodiment only in the manner the electrical signal 13 is produced and the manner in which the signal 16 is utilized to control the cutting feed rate.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A method for controlling the cutting feed speed of band saw machines equipped with a toothed saw band to attain an optimum feed velocity with substantial constant safety against straying, comprising the steps of empirically determining under predetermined conditions an acceptable optimum cutting force representing a desired cutting force value, calculating from said acceptable optimum cutting force the corresponding residual tensile stress in the saw band, and continuously maintaining the saw band under said residual tensile stress within the critical zone of the teeth by measuring the actual value of the cutting force, comparing the actual cutting force value with the desired cutting force value, and adjusting the actual cutting force in case of differences between the actual and desired cutting force value to thereby maintain an at least approximately constant value of said residual tensile stress and therewith obtain substantially optimum feed velocity during cutting of the workpiece.

2. The method according to claim 1, further comprising the step of adjusting the desired cutting force value in accordance with changes from said predetermined conditions, and then comparing the thus-adjusted desired-value with the actual value, and regulating the cutting feed velocity for adjusting the actual-value to the desired-value if an inequality between the compared values exists.

3. The method according to claim 2, further comprising selecting as the actual-value the sum total of all cutting forces in the feeding direction.

4. The method according to claim 2, further comprising selecting as the actual-value the flexing angle of the saw band.

5. The method according to claim 2, further comprising changing the desired-value during cutting of the workpiece in a programmed manner.

6. The method according to claim 5, wherein the desired-value is changed during cutting of the workpiece by storing a program for such changing and using the same with a computer.

7. An apparatus for controlling the cutting feed velocity of band saw machines to obtain an optimum feed velocity with substantially constant safety against straying of the saw cut, comprising a band saw machine having a toothed saw band, and control means for controlling the cutting force of the saw band to continuously maintain the toothed saw band, within a critical zone of its teeth under an at least approximately constant predetermined residual tensil stress including means for producing a signal representative of the value of the actual tensile stress in the critical zone of the saw band, means comparing said signal with a signal representative of the desired value of the predetermined residual tensile stress, and means for adjusting the actual value to the predetermined desired-value for the residual tensile stress to thereby realize substantially optimum feed velocity while preventing straying of the saw cut.

8. The apparatus according to claim 7, wherein the control means includes means for changing the desired-value signal in accordance with changes in the sawing conditions as a result of changes in the shape of the stock to be cut, in the material of the stock and in the wear of the teeth.

9. The apparatus according to claim 8, wherein said adjusting means comprises means for changing the cutting feed velocity of the saw band.

10. The apparatus according to claim 9, wherein the band saw machine includes a saw carriage, and wherein the control means is operable to change the cutting force of the saw band by load changes of the saw carriage.

11. The apparatus according to claim 9, wherein said feed velocity adjusting means comprises a hydraulic piston and cylinder unit upon which a saw carriage carrying said sawband rests.

12. The apparatus according to claim 9, wherein said feed velocity adjusting means comprises a vertically displaceable spindle and rotatably motor driven nut unit, and a saw carriage carrying said saw band resting on said spindle.

13. The apparatus according to claim 11, wherein said sensor means comprises a pressure pickup means for producing a signal as a function of a load imposed upon a hydraulic fluid within said piston and cylinder unit due to the force applied by said saw carriage resting thereon.

14. The apparatus according to claim 12, wherein said sensor means comprises a pressure transducer means interposed between said spindle and said saw carriage for producing a signal as a function of a load imposed by said saw carriage resting thereon.

15. The apparatus according to claim 9, 11 or 12, wherein the means for producing a signal representative of the value of the actual tensile stress includes means for sensing the bending angle of the saw band.

16. The apparatus according to claim 7 wherein a safety means for shutting off the apparatus upon reaching a settable minimum value of saw band feed is provided.

17. The apparatus according to claim 8, wherein means are provided in the apparatus for selecting said desired value corresponding to the cross-sectional configuration of the workpiece being cut.

18. The apparatus according to claim 7, wherein further means are provided in the apparatus which, in case the residual tensile stress value falls below a minimum in the critical zone of the saw band, are operable to produce a signal.

19. The apparatus according to claim 8, wherein switchover means are provided in the apparatus to maintain the feed velocity at a constant value.

20. The apparatus according to claim 8, wherein said control means comprises an integrated computer means for calculating the optimum feed velocity, based on the desired value for the residual tensile stress of the saw band, and further means operable to program additional parameters affecting the feed velocity into the computer means.

21. The apparatus according to claim 18, wherein said further means are operable to shut down the apparatus.

* * * * *